Patented Feb. 14, 1950

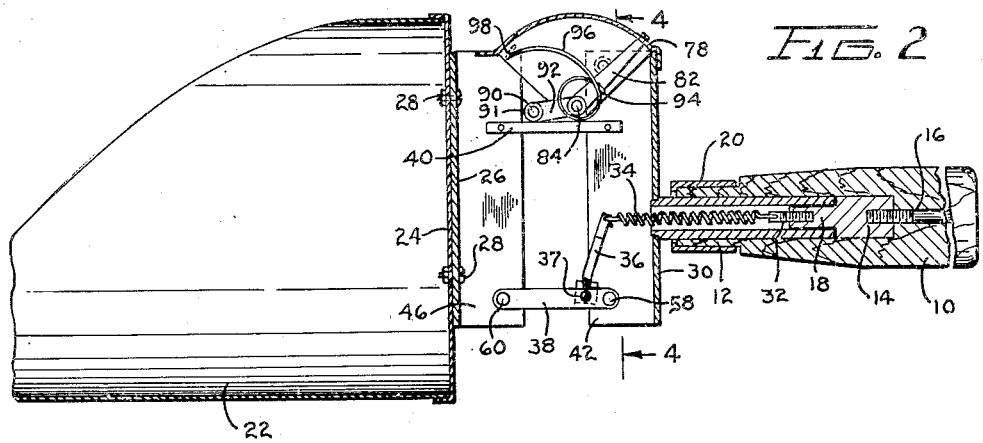
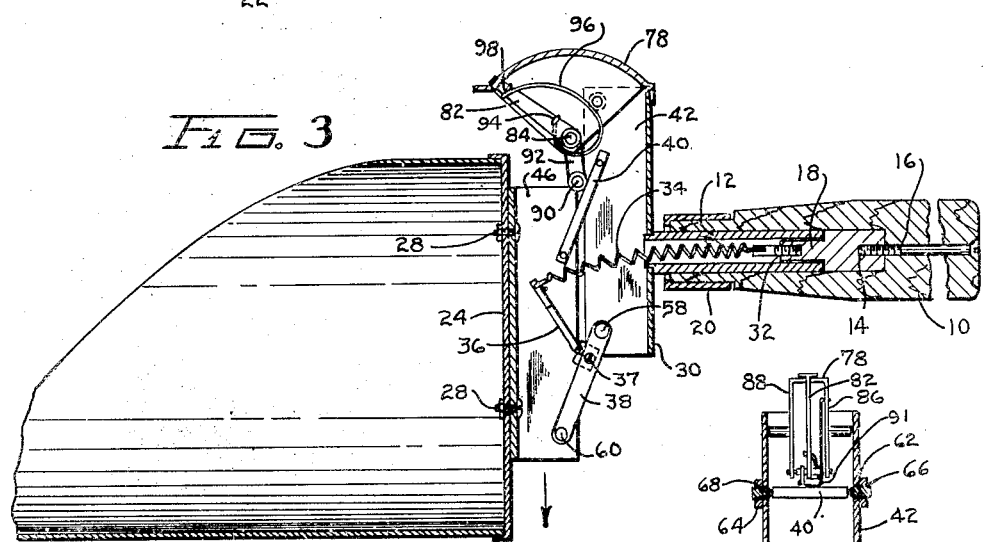
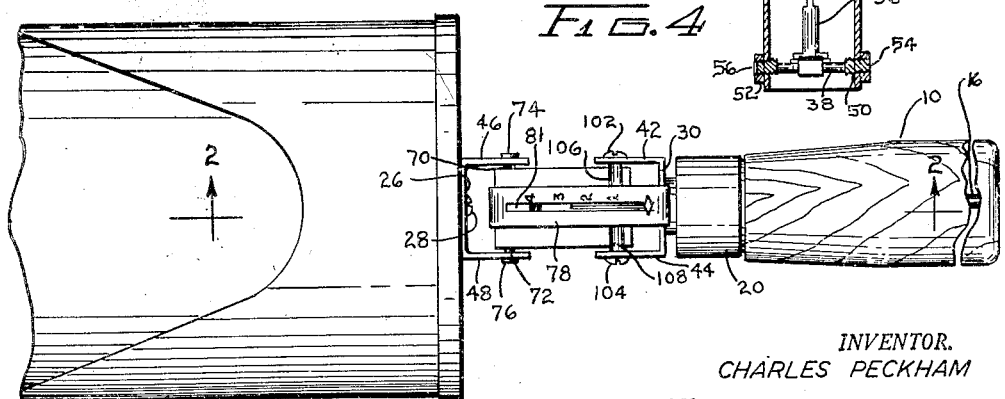

2,497,271

UNITED STATES PATENT OFFICE 2,497,271

WEIGHING SCOOP

Charles Peckham, New York, N. Y., assignor to The Robson Corporation, New York, N. Y., a corporation of New York Application February 7, 1947, Serial No. 727,198

1 Claim. (Cl. 265—66)

The present invention relates to a combined scoop and automatic weighing apparatus.

My invention contemplates the provision of a scoop that is adapted to dip out quantities of granular like materials such as animal feeds, sugar, flour and the like and which scoop is so combined with a weighing spring that the weight of material scooped up is automatically indicated on a scale forming part of the combination.

My invention contemplates the provision of such a combined scoop and scale that will accurately weigh the quantity of material dipped out by the scoop irrespective of the angle at which the scoop may be held.

With a combined scoop and scale of the present invention, it is not necessary to pour the contents of the scoop into a separate container on a separate scale in order to weigh them nor, by reason of its construction, is care required to hold the scoop in a particular position in order to have it accurately indicate the weight dipped out by it.

The invention further contemplates the provision of such a combined scoop and weighing means that is simple to use, strong and durable in construction and relatively inexpensive to manufacture.

Other objects and advantages of the present invention will be clear from the description which follows and the drawing appended thereto, in which Fig. 1 is a plan view looking down on a combined scoop and weighing scale according to my invention, the handle and scoop being broken away to condense the drawing.

Fig. 2 is a section on the line 2—2 of Fig. 1.

Fig. 3 is a view similar to Fig. 2 but with the scoop depressed under the weight of a quantity of material carried therein.

Fig. 4 is a section on the line 4—4 of Fig. 2.

Referring now to the drawing, the combined scoop and weighing scale of my invention is carried by the handle 10 in the interior of which the sleeve 12 is mounted.

The undercut weighing spring carrying member 14 is held in the handle 10 by the set screw 16, which is accessible from the exterior of the handle, and has the integral element 18 inserted in the interior of the sleeve 12 one end of which is mounted in the base 30. The entire assembly thus described is held in the handle by means of the sleeve 12 and set screw 16 which thereby hold the member 14 in position. The hollow cap or collar 20 is mounted around the end of the handle 10.

A scoop 22 of the conventional type formed of suitable metal and having the rear wall 24 is secured to the longitudinal wall or base 26 of a channel shaped bracket member (which for convenience will also be referred to by the reference character 26) by means of the set screws or studs 28.

The end of the sleeve 12 is pressed into the longitudinal wall or base 30 of a similar channel shaped bracket member (which for convenience will be referred to by the reference character 30).

I connect to the threaded member or stud 32 mounted in the interior of the throat of the element 18, one end of the weighing spring 34 and connect the other end of this spring to the finger or rod 36.

This finger or rod 36 at 37 is secured to the link 38, which link 38 together with the upper link 40 forms a connecting parallelogram for the channel brackets 26 and 30, to the action of which further reference will be made. The finger or rod 36 is substantially perpendicular (held at right angles) to the lower link 38 and is of such length that the weighing spring 34 is always substantially horizontal, that is perpendicular to the wall 24 and the base 26 and the base 30 as the scoop 22 is pulled down by the weight of the material carried in it.

Thus, the tension on the weighing spring 34 is the same irrespective of the angle at which the scoop itself may be held, thereby insuring, within the limits for which the scoop is designed, an accurate determination of the weight of the material.

In order to effect such accuracy of weight reading, I connect the channels 26 and 30 so that they will at all times be parallel to one another as the scoop 22 is pulled down under the influence of the weight of material held by it.

This is accomplished by the parallelogram connection formed by the connecting links 38 and 40 which are of equal lengths. The links are pivotally secured at each side thereof, on the inside of the channel members 26 and 30, to the channel sides 42, 44 and 46, 48 by any suitable pinpoint bearing.

In the example illustrated, the bearings on the sides of the lower link 38 are mounted in corresponding sockets 50 and 52 secured to the channel sides 42 and 44 by the set screws 54 and 56 (Fig. 4) and in corresponding sockets secured to the channel sides 46 and 48 by corresponding set screws. (In Figs. 2 and 3, because of the character of these figures, only the bearings 58 and 60 are illustrated.)

The upper link 40 is similarly secured to the sides 42 and 44 of the channel by the pinpoint sockets 62 and 64 secured thereto by the screws 66 and 68, the connection to the channel sides 46 and 48 by the similar pinpoint sockets 70 and 72 and screws 74 and 76.

Thus, the channel 26 is always held parallel to the channel 30 as it moves downwardly by the links 38 and 40 which pivot on relatively frictionless bearings.

A suitable calibrated scale 78 arranged on top of the channel member, handle and scoop connection, is mounted on the base 30 as by means of screws not shown.

The calibrated scale 78 is provided with the slot 81 in which the pointer or indicator 82 is moved as the scale is weighed down by the material in it to indicate its (the material's) weight.

The pointer 82 at its lower end is secured to the pivot shaft 84 mounted in the sides 86 and 88 depending from the scale 78.

The pivot shaft 84 is connected to the shaft 90, on which the roller 91 is rotatably mounted and which is held against the link 40 by means of the torsion spring 96. The link 92 is keyed to the shaft 84 and rotates on the shaft 90 so that the reciprocation of the channel bracket 26 is translated into oscillation of the pointer 82 with the pivot shaft 84.

In order to insure the return of the pointer 82 to the normal position illustrated in Fig. 2, I connect one end 94 of the coil spring 96 to the pointer 82 and the other end 98 of the coil spring to the side 86 of the scale.

When the scoop is downwardly weighted, the pointer 82 under the influence of the spring 96, moves in the slot 80 to indicate the weight, the coil spring 96 being unwound and when the weight on the scoop is released to return it to normal position by the pull of the spring 34, the pointed 82 is concurrently returned to normal position.

The sides 86 and 88 of the scale 78 are secured to the channel sides 42 and 44 by means of the screws 102 and 104, which carry the spacers 106 and 108.

It will now be recognized that by the reason of the parallelogram link connection securing the carrying channel members together, the scoop supporting channel will at all times move parallel to the handle carrying channel and that the weighing spring will always be extended at right angles to these carrying channels so that the accuracy of the weight reading will not be disturbed by the angle at which the scoop may be held.

It is to be understood that the practical embodiment of my invention that has been heretofore described and illustrated is by way of example only, and is not to be considered as limiting such invention and that I desire to be protected for any modifications or variations of the invention that may be within its spirit and scope and within the scope of the claim hereto appended.

I claim:

A weighing scoop comprising a handle having a sleeve extending therefrom, a first channel member having a base and spaced sides, the sleeve member mounted on the base of the first channel member at right angles thereto, a second channel member having a base and spaced sides, said second channel member spaced from the first channel member and movable parallel thereto and perpendicularly to the handle downward with respect thereto, a scoop mounted on the base of the second channel member and extending outwardly therefrom, means connecting the channel members together and comprising a lower link pivoted at one end to the sides of the first channel member therebetween and at the other end to the sides of the second channel member therebetween and an upper link pivoted at one end to the sides of the first channel member therebetween and at the other end to the sides of the second channel member therebetween, an indicating finger cooperating with the upper link at substantially right angles thereto and a weighing spring secured at one end in the sleeve to the interior of the handle and at the other end to the indicating finger and to be extended upon placing a weight in the scoop, said finger being of dimensions such that the weighing spring is maintained at right angles to each of the channel members upon its extension by a weight in the scoop.

CHARLES PECKHAM.

REFERENCES CITED

The following references are of record in the file of this patent:

UNITED STATES PATENTS

| Number | Name | Date |
|---|---|---|
| 1,016,246 | Ault et al. | Feb. 6, 1912 |
| 1,058,713 | Bertram | Apr. 15, 1913 |
| 2,196,280 | Thornhill | Apr. 9, 1940 |
| 2,311,437 | Homrighous | Feb. 16, 1943 |